United States Patent [19]
Vermeer et al.

[11] Patent Number: 6,056,635
[45] Date of Patent: May 2, 2000

[54] METHOD AND MEANS OF LINKING SAUSAGE

[75] Inventors: William H. Vermeer, Des Moines; Robert W. Damstetter, Ankeny; William E. Ryan, IV, Ames, all of Iowa

[73] Assignee: Townsend Engineering Company, Des Moines, Iowa

[21] Appl. No.: 08/296,122

[22] Filed: Aug. 25, 1994

[51] Int. Cl.$^7$ .................................................. A22C 11/02
[52] U.S. Cl. .................................. 452/46; 452/35; 452/30
[58] Field of Search .................................. 452/35, 30, 46, 452/47

[56] References Cited

U.S. PATENT DOCUMENTS

| | | |
|---|---|---|
| 3,115,668 | 12/1963 | Townsend . |
| 4,112,546 | 9/1978 | Muller . |
| 4,370,779 | 2/1983 | Meier ........................................ 452/35 |
| 4,451,954 | 6/1984 | Müller et al. ............................ 452/35 |
| 4,539,796 | 9/1985 | Nakamura et al. ...................... 452/40 |
| 4,580,316 | 4/1986 | Günter .................................... 452/46 |
| 5,083,970 | 1/1992 | Reutter .................................... 452/30 |
| 5,092,813 | 3/1992 | Kassi et al. .............................. 452/46 |

FOREIGN PATENT DOCUMENTS

| | | |
|---|---|---|
| 0 143 311 A1 | 6/1985 | European Pat. Off. . |
| 568372A2 | 4/1993 | European Pat. Off. . |
| 2 214 413 | 8/1974 | France . |
| 2 620 902 | 3/1989 | France . |
| 6 601 083 | 7/1966 | Netherlands . |
| 9201169 | 9/1994 | Netherlands . |
| 466 072 | 1/1969 | Switzerland . |
| 2 050 801 | 1/1981 | United Kingdom . |

OTHER PUBLICATIONS

Micro Motion, Inc. Product Catalog –Jul. 1990.

*Primary Examiner*—Willis Little
*Attorney, Agent, or Firm*—Zarley, McKee, Thomte, Voorhees & Sease

[57] ABSTRACT

A machine for linking sausage has a pump, a stuffing tube, a casing on the stuffing tube, and a pair of linking chains downstream from the outlet end of the stuffing tube. A scale is located downstream of the discharge end of the stuffing tube and is operatively connected to the pump to increase or decrease the output speed of the pump as the weight of the encasing product decreases or increases, respectively from a predetermined target weight. A proximity sensor monitors the linking chains as they are rotating and senses variations in the distance between the linking elements as compared to a predetermined distance to determine stretching of the chains. A mass flow sensor on the machine adjacent the outlet of the pump measures the mass of meat emulsion exiting the pump, and increases or decreases the output of the pump as the mass thereof decreases or increases, respectively from a predetermined target mass. The method of linking sausage comprises sensing mass flow of the output of the pump and regulating the pump speed thereby, using a proximity sensor to monitor the linking chains to determine stretching thereof, and weighing the encased product and increasing or decreasing the output speed of the pump as the weight of the product decreases or increases, respectively with respect to a predetermined target weight.

1 Claim, 9 Drawing Sheets

METHOD AND MEANS OF LINKING SAUSAGE

BACKGROUND OF THE INVENTION

Sausage linkers such as that shown in U.S. Pat. No. 3,115,668 use metering gears to control meat emulsion flow. The gears cause detrimental smearing of the meat.

Prior art casing linkers often make it difficult for the operator to tie off the lead and tail end of the meat casing, which cause some wastage of meat.

Further, existing linkers using linking chains cause the chains to stretch with use, and do not provide any accurate way of measuring this stretching so as to determine when the chain should be replaced.

Existing linking machines do not automatically weigh the product, and have no way to correct for weight variance.

Accordingly, features and objectives of the instant invention are as follows:

1. Mass Flow vs. Volumetric metering: By using a mass flow sensor to measure the flow of meat and thereby govern the meat pump the NL-14 has several advantages over a machine using metering gears. First, meat is less smeared using mass flow because it passes through a smooth stainless steel tube rather than a set of metering gears while being metered. This gives operators that ability to produce product with improved particle definition. Second, the mass flow meter is capable of measuring differences in meat density which can be analyzed by the PLC to provide important information about sudden difference in meat composition to the machine's operator.

2. Pressure Sensing: By controlling the flow of meat with an in line transducer (pressure sensor) rather than with metering gears the ability of the machine to produce large particle product is improved because the product is not smeared by metering gears. The transducer senses when meat is or is not required by sensing in line meat pressure and turns the meat pump on or off accordingly.

3. Twist Ramping: By adding additional twist to the lead and tail end of the casing the operator is given more time to tie off the casing before it is able to untwist. The additional twist is achieved by cycling the Twister through an RPM ramp in which the lead and tail end of the casting receive higher twist RPM then does the mid section.

4. Chain Stretch Test: By measuring the amount of stretch that has developed between butterflies on the linking chains the operator is able to gauge when the chains need to be replaced. The chain stretch is measured by comparing the known distance between a new set of chains of a given pitch with chains of the same pitch being tested. The distance between the butterflies is measured by a proximity sensor located near the chains as the chains rotate.

5. Auto weigh conveyor: By automatically measuring the weight of the product and automatically adjusting the machine to correct for any weight variance, the auto weigh feature enables the operator to test and adjust product weight without using a separate scale thereby saving time and increasing accuracy.

6. Follower Control: An ultra sound sensor mounted on the follower can automatically control various motors and clutches as it reaches different positions by traveling along with the follower rod.

SUMMARY OF THE INVENTION

A mass flow sensor is used to measure the flow of meat which thereupon controls the linker mechanism.

A pressure sensor is used to measure the flow of meat which thereupon controls the linker mechanism.

Means are provided to add an additional twist to the lead and tail end of the casing and the operator is given more time to tie off the casing before it is able to untwist.

A proximity sensor is located near the linking chains to measure the distance between linking butterflies to determine chain stretch.

A weighing device is provided to measure the weight of the product and automatically adjust the machine to correct for any weight variance.

A sonic follower control is provided to allow the follower to actuate various components of the machine.

DESCRIPTION OF THE PREFERRED EMBODIMENT

Figures 1, 3:
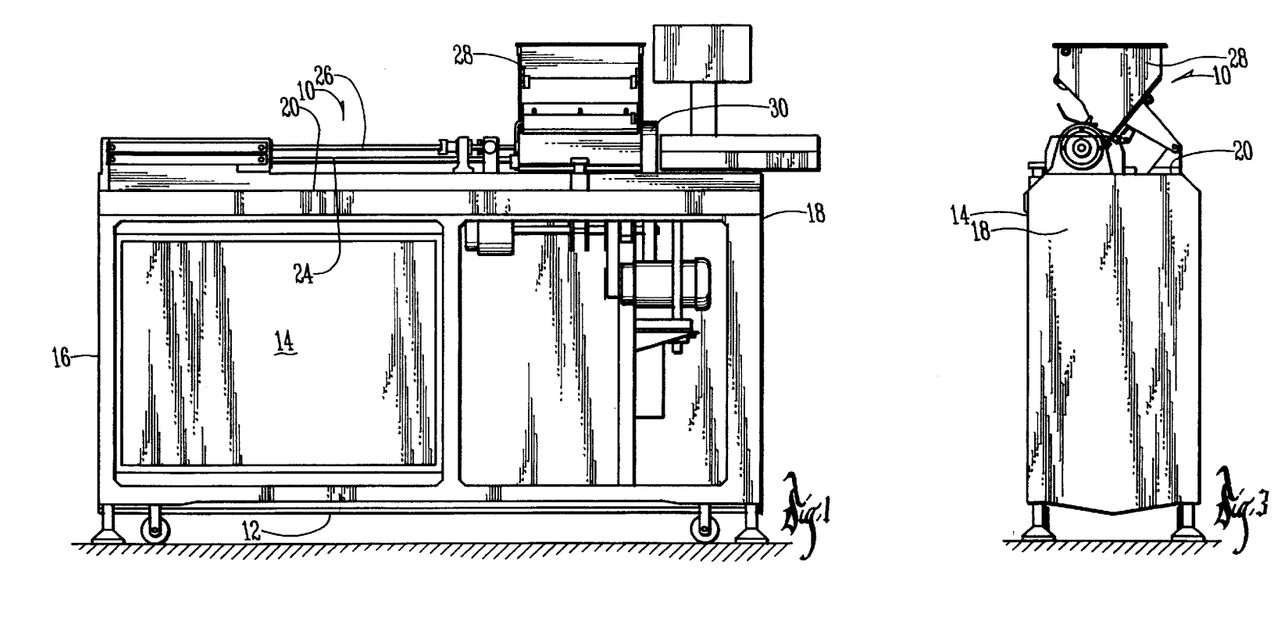
FIG. 1 is a front elevational view of the device of this invention.
FIG. 3 is an end elevational view as viewed from the right-hand end of FIG. 1.

The numeral 10 comprises a sausage linker machine having a frame 12 which is comprised from front 14, and 16 and 18, and top 20.

Figure 2:
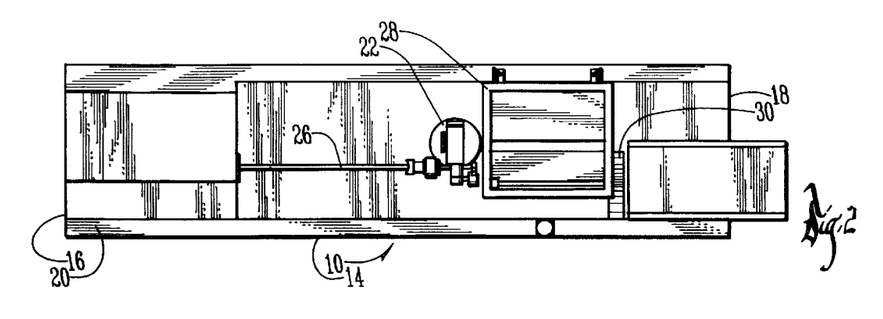
FIG. 2 is a top plan view thereof.
Figure 4:
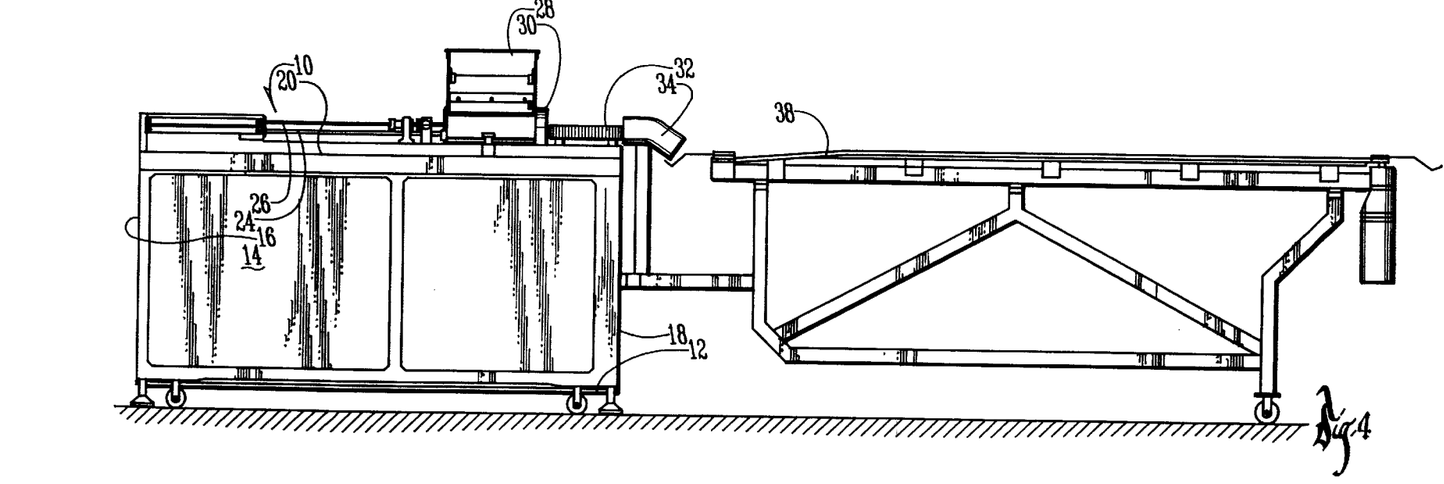
FIG. 4 is a view of the device of FIG. 1 shown at a reduced scale with a conveyor attached to the outlet end thereof.

A conventional emulsion pump 22 is mounted on frame 12 and is in communication with a conventional hollow elongated stuffing tube 26 through which the meat emulsion is moved by pump 22. An elongated follower arm 24 is mounted on the top of frame 12. A casing hopper 28 is mounted on the top of frame 12. A chuck 30 is mounted on the discharge end of stuffing tube 26. A conventional set of linking chains 32 is mounted on frame 12 immediately downstream from chuck 30. Linked sausages move conventionally from the linking chains 32 through discharge tube 34 onto a conveyor 38 having a load cell 40 (scale).

A conventional mass flow sensor 44 (FIG. 12) is in communication with the output side of pump 22 and is operatively connected to the power source for linker 32 to control the mass flow of meat emulsion.

Figure 15:
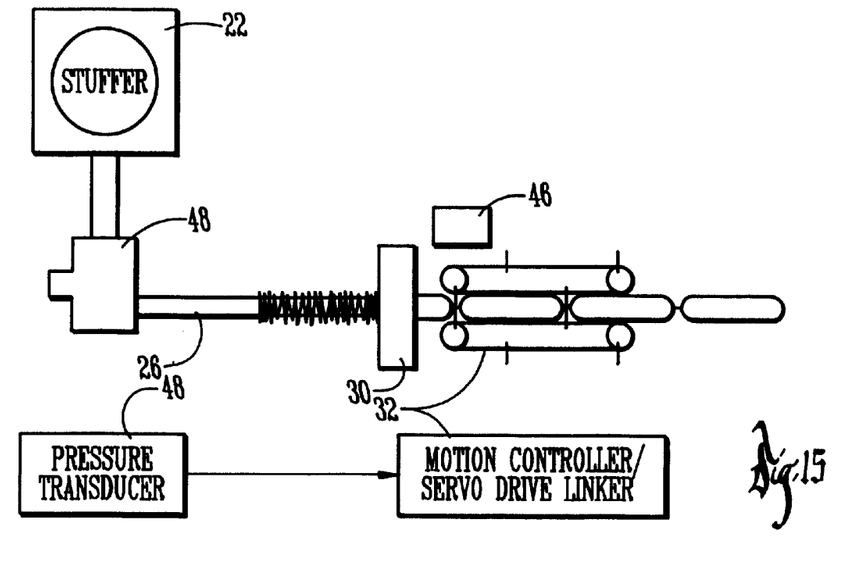
FIG. 15 is a schematic view of the pressure transducer linker control.
Figure 16:
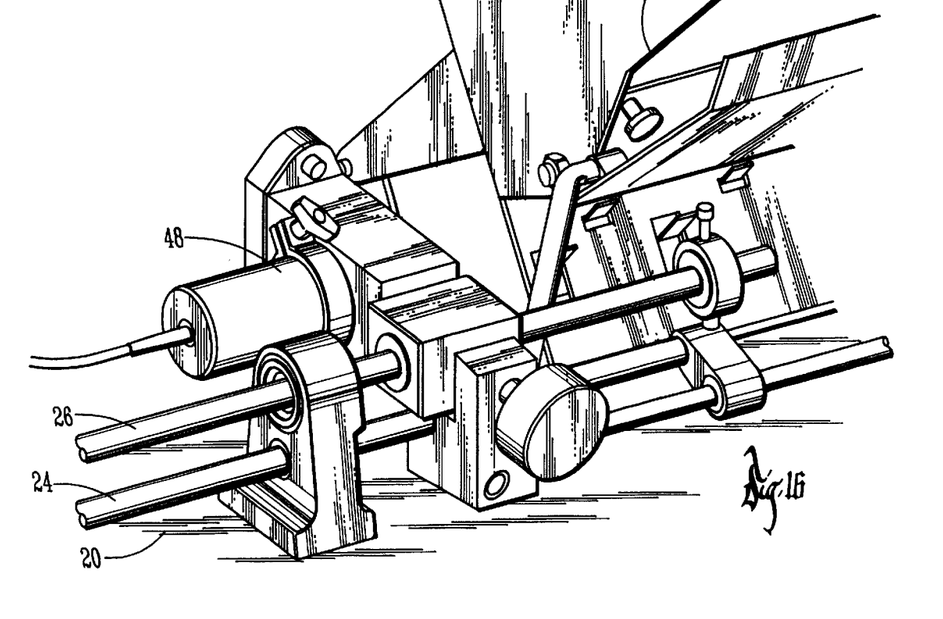
FIG. 16 is a perspective view of the pressure transducer linker control.

A proximity sensor 46 (FIG. 15) is mounted adjacent linker chains 32 to measure the distance between the conventional butterflies on the linking chain. The chain stretch is measured by comparing the known distance between a new set of chains of a given pitch with chains of the same pitch being tested. The proximity sensor 46 functions as the chains are rotated.

Figure 12:
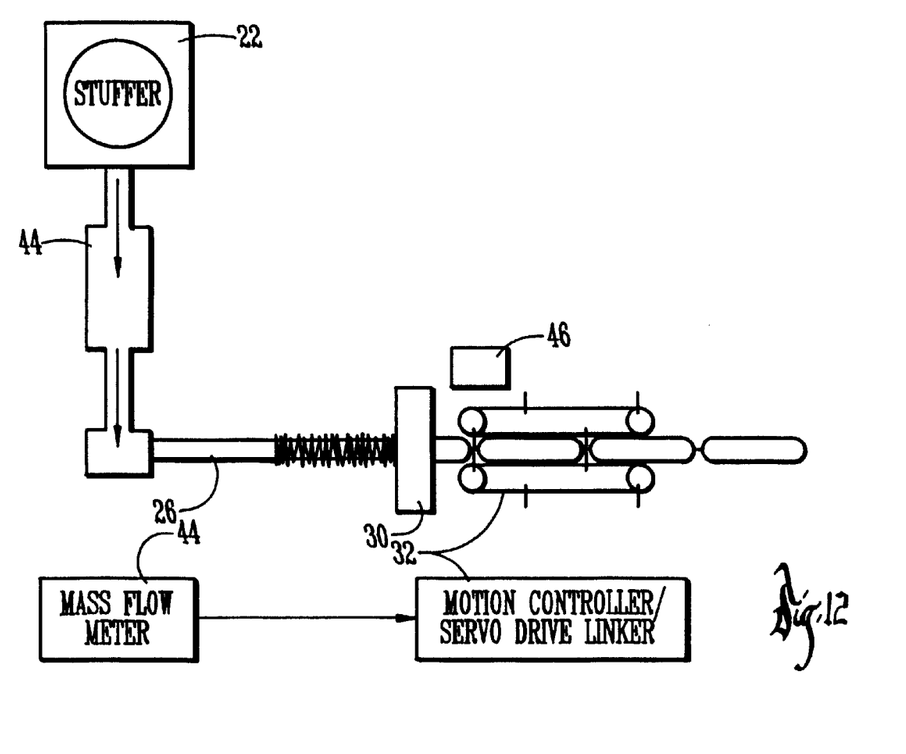
FIG. 12 is a schematic view showing the gravimetric linking control (mass flow sensor)
Figure 13:
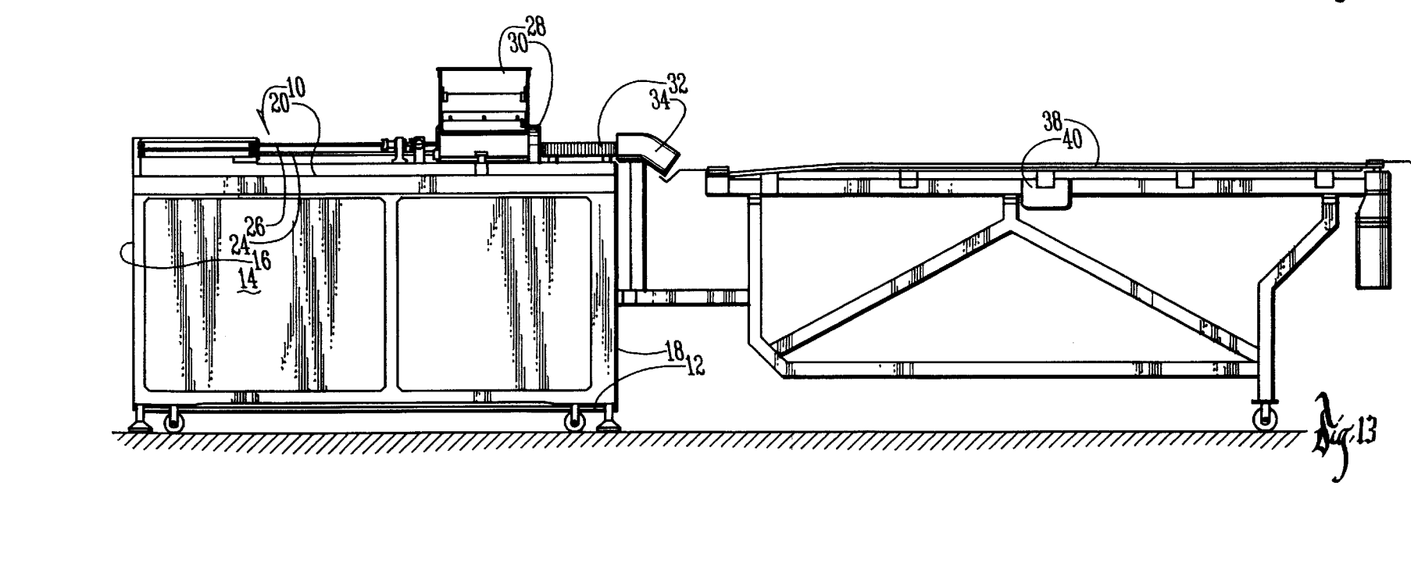
FIG. 13 is a view similar to that of FIG. 4 with legends thereon showing the load cells associated with the conveyor.
Figure 14:
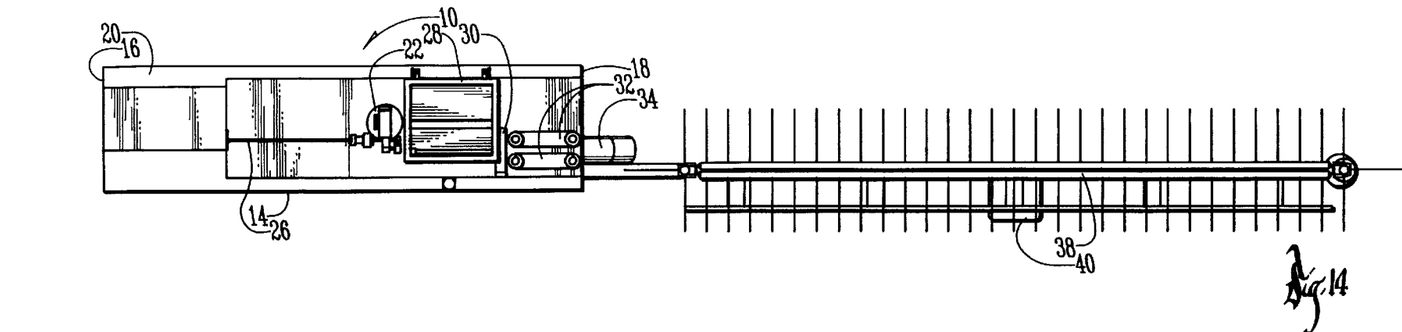
FIG. 14 is a plan view of FIG. 13.

By using the mass flow sensor 44 to measure the flow of meat and thereby govern the pump 22, the meat is less smeared because it passes through a smooth stainless steel tube 26 rather than a set of conventional metering gears. This gives the operators the ability to produce product with improved particle definition. Secondly, the mass flow meter is capable of measuring differences in meat density which can be analyzed by a PLC to provide important information about sudden difference in meat composition to the machine's operator.

By controlling the flow of meat with an in line transducer rather than with metering gears, the ability of the machine to produce large particle product is improved because the product is not smeared by metering gears. The transducer senses when meat is or is not required by sensing in line meat pressure and turns the meat pump on or off accordingly.

Figure 5:
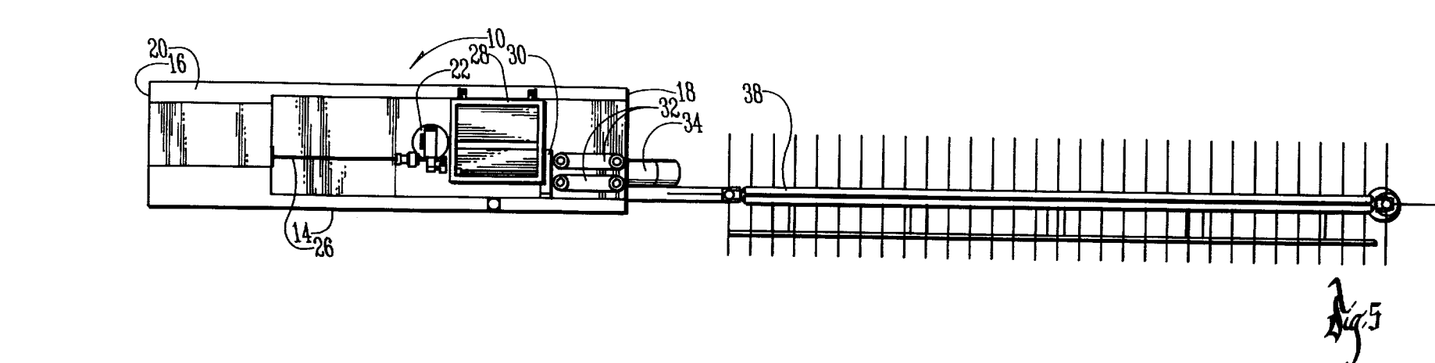
FIG. 5 is a top plan view of the device of FIG. 4.
Figure 6:
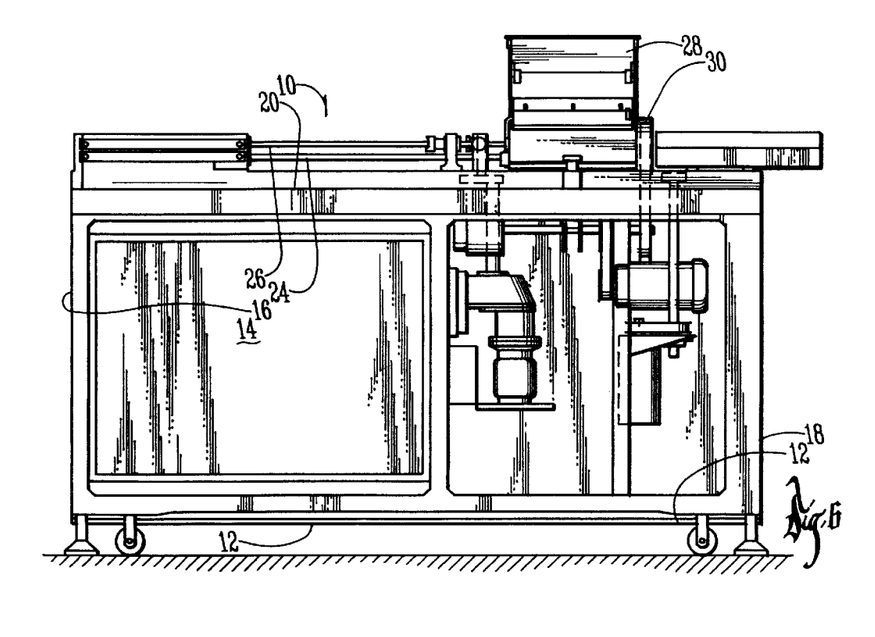
FIG. 6 is a front elevational view similar to that of FIG. 1 but with the power train shown thereon.
Figure 7:
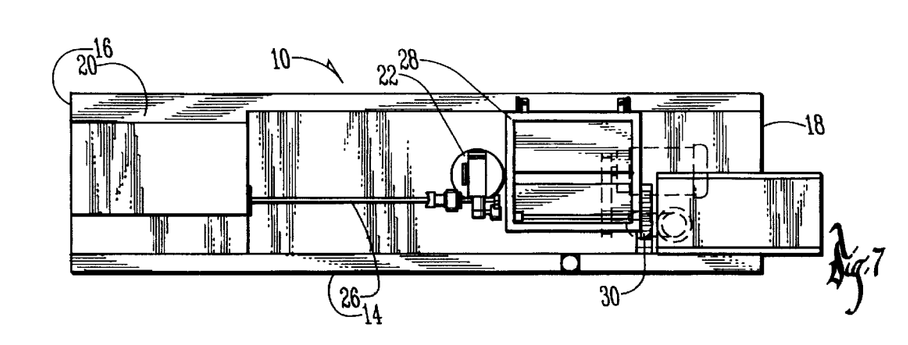
FIG. 7 is top plan view similar to that of FIG. 1 but also showing the power train imposed thereon.
Figure 8:
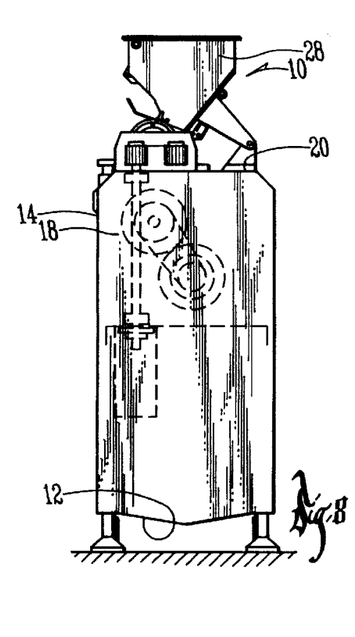
FIG. 8 is an end elevational view similar to that of FIG. 3 but shows the power train imposed thereon.
Figure 9:
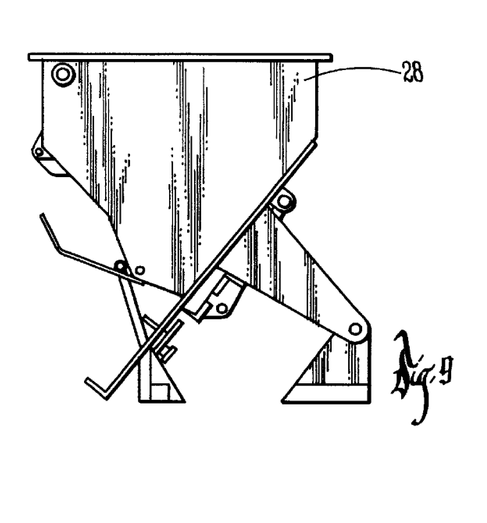
FIG. 9 is an enlarged scale end elevational view of the casing hopper.
Figure 10:
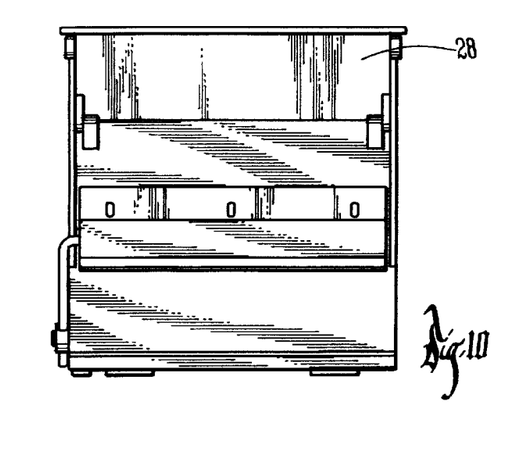
FIG. 10 is a side elevational view of the device shown in FIG. 9 as viewed from the left hand side thereof.
Figure 11:
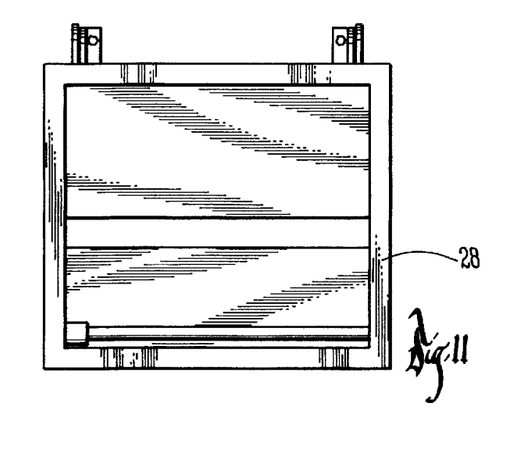
FIG. 11 is a top plan view of the device shown in FIG. 9.

The proximity sensor 46 (FIG. 5) measures the amount of stretch that has developed between butterflies on the conventional linking chains. The operator is therefore able to gauge when the chains need to be replaced. The chain stretch is measured by comparing the known distance between a new set of chains of a given pitch with chains of the same pitch being tested. The distance between the butterflies is measured by the proximity center while the chains are rotated, as described above.

A pressure transducer 48 (FIG. 15) is associated with the stuffing tube and is operatively connected to the linker so that under conditions of reduced pressure or increased pressure, the speed of the linker can be increased or decreased to accommodate for the changes in pressure of the meat supply.

Figure 17:
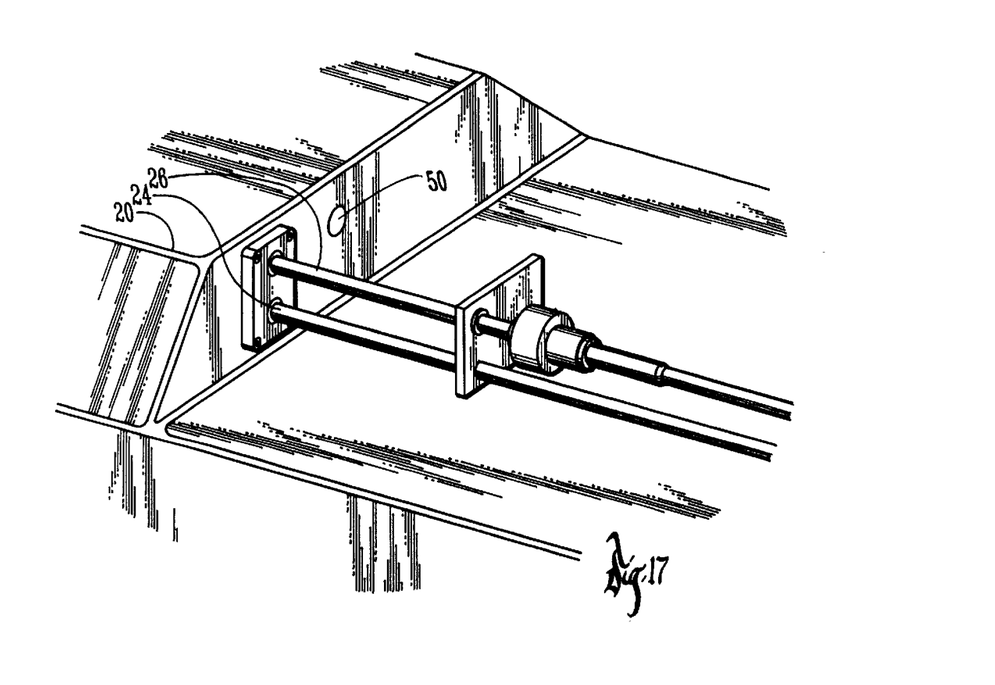
FIG. 17 is a perspective view of the ultra sonic follower sensor.
Figure 18:
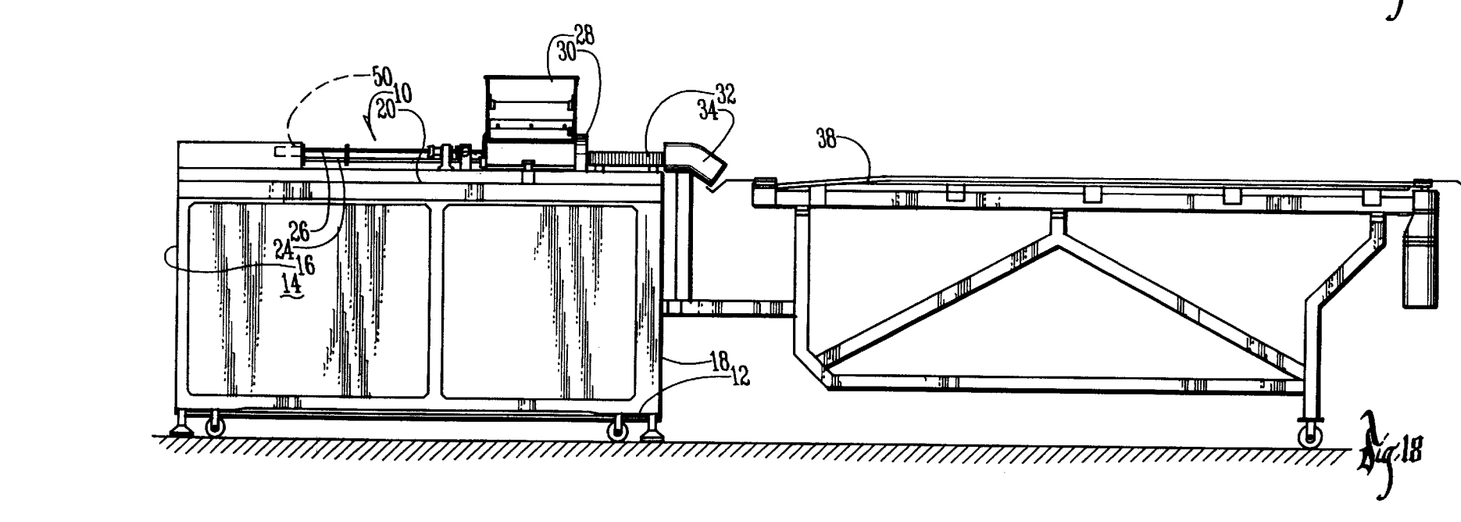
FIG. 18 is a view similar to that of FIG. 4 but shows the ultra sonic follower sensor.
Figure 19:
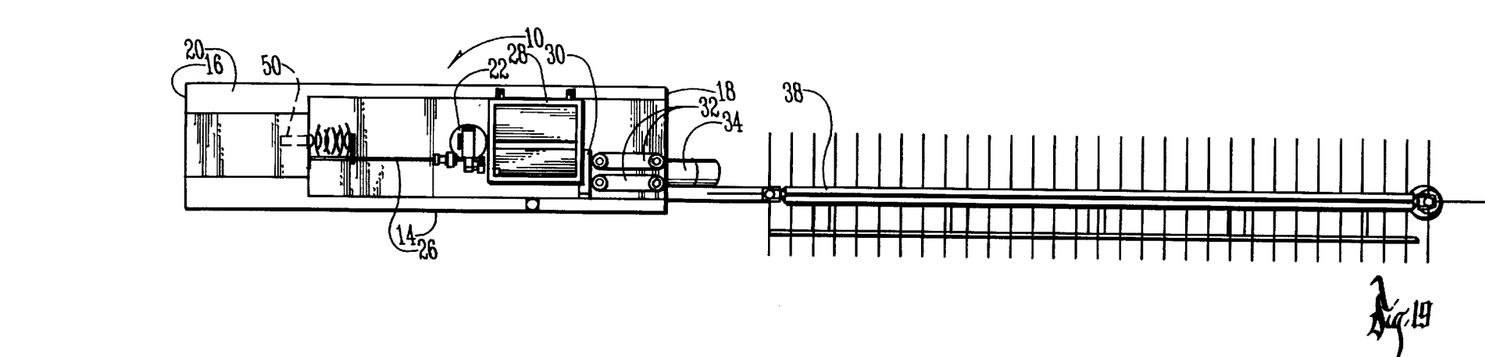
FIG. 19 is a plan view of FIG. 18.

FIGS. 17, 18 and 19 show the ultra sonic follower 50 on follower 24. The purpose of the ultra sonic follower 50 is that as the follower 24 moves longitudinally to move the casing on the stuffing tube 26, the element 50 can function to actuate various motors, clutches, etc. in the machine which need to become operative or inoperative at various stages of the longitudinal travel of the follower rod 24.

By automatically measuring the weight of the encased product and automatically adjusting the machine to correct for any weight variance through the PLC, the automatic weighing feature enables the operator to test and adjust product weight without using as separate scale thereby saving time and increasing accuracy. The scale 38 is operatively connected to the pump 22 so that increases or decreases in weight as sensed by the scale will cause decreases or increases, respectively, in the output of the pump.

The operator can add an additional twist to the lead and tail end of the casing and this is to provide more time for the operator to tie off the casing before it is able to untwist. The additional twist is achieved by cycling the twister through an RPM ramp in which the lead and tail end of the casing receive higher twist RPM's than does the mid section of the casing.

It is therefore seen that this invention will achieve all of its stated objectives.

What is claimed is:

1. The method of encasing a meat product by means of a pump causing a non-encased meat product to flow through an encasing machine to be encased, moving the encased product exiting the machine onto a weighing scale, weighing the encased meat product exiting the machine and comparing the weight thereof to a predetermined target weight, and increasing or decreasing the rate of flow of meat product from said pump in response to the measured weight and without stopping the pump so as to compensate for any variance in weight between the weighted encased product and said target weight, said weight of said encased product being determined by said scale.

* * * * *